No. 726,812. PATENTED APR. 28, 1903.
W. E. BAKER.
PROCESS OF MANUFACTURING COFFEE.
APPLICATION FILED MAY 13, 1902.
NO MODEL.
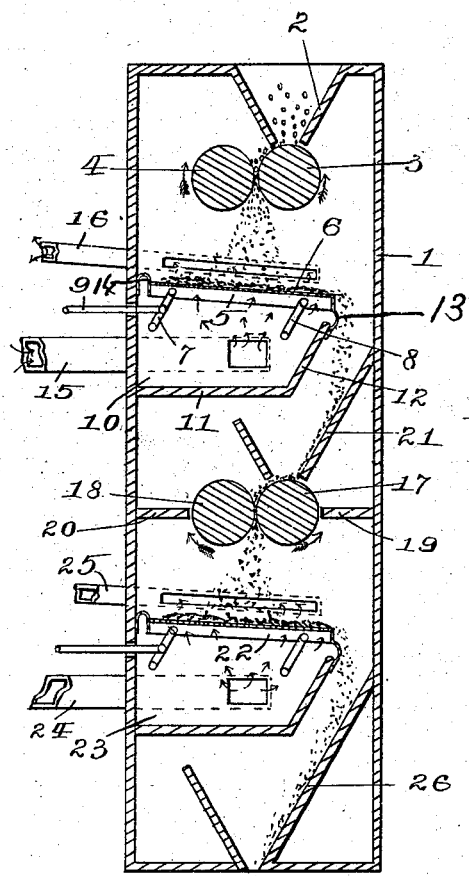
Fig. 1.
Fig. 2. Fig. 3.
 
Witnesses: Inventor:
W. L. Thauwald William E. Baker
B. K. Schriber by: Stryker & Bradbury
Attorneys.
THE NORRIS PETERS CO., PHOTO-LITHO., WASHINGTON, D. C.

UNITED STATES PATENT OFFICE.

WILLIAM E. BAKER, OF MINNEAPOLIS, MINNESOTA.

PROCESS OF MANUFACTURING COFFEE.

SPECIFICATION forming part of Letters Patent No. 726,812, dated April 28, 1903.

Application filed May 13, 1902. Serial No. 107,093. (No specimens.)

*To all whom it may concern:*

Be it known that I, WILLIAM E. BAKER, a citizen of the United States of America, and a resident of Minneapolis, in the county of Hennepin and State of Minnesota, have invented certain new and useful Improvements in Processes of Treating Coffee, of which the following is a specification.

My invention is designed for the production of an improved article of manufacture consisting of granulated roasted coffee having the granules of uniform size and having the dust, chaff, and other impurities, including a portion of the tannic acid, removed therefrom; and the invention resides in a novel process of treating the coffee and in the improved product obtained as a result thereof.

As is well known, the coffee-bean may properly be described as substantially a lobated berry enveloped by a silver skin which extends into the interior of the bean, surrounding or partially surrounding the core. In the ordinary treatment of green coffee, prior to roasting and granulating the same, the outer portion of this silver skin, or that which covers the exterior of the bean, is removed by hulling and winnowing. That portion of the silver skin, however, which extends into the interior of the bean cannot be removed by this process, and as a result when the coffee is roasted and ground it forms part of the final ground product, which is sold to the trade and afterward made up into the beverage. This remaining silver skin when ground constitutes what may be termed the "chaff," which detracts from the appearance of the granulated coffee. Furthermore, it contains a large percentage of tannic acid, which is not only injurious, but is bitter, and thereby detracts from the flavor or aroma of the body of the bean. It is the purpose of my invention to remove from the granulated coffee this chaff, consisting of the tannic-acid-containing skin, as well as the dust created by grinding, crushing, or otherwise granulating the coffee-bean.

One form of apparatus by which my invention may be carried out is illustrated in Figure 1 of the drawings, which shows the same in sectional elevation. Figs. 2 and 3 of the drawings are sectional views of a coffee-bean after the outer skin has been removed.

The apparatus shown in Fig. 1 is a crushing and separating device, consisting of a casing 1, having a chute or hopper 2 at its upper end, through which the coffee-beans are introduced into the machine. Located beneath the discharge end of the chute 2 are the crushing-rolls 3 4 of any suitable or preferred construction, the same being designed to crush or break up the coffee-beans into comparatively coarse granules. Beneath the crushing-rolls 3 4 is located a reciprocating or shaking screen 5, the same consisting of a frame having a covering 6, of bolting-cloth, wire-netting, or other reticulated material. The frame of the screen 5 is pivoted at opposite ends to links 7 and 8, which are themselves pivoted to the frame of the casing 1 at their lower ends. These links constitute supports for the screen 5, and the latter is adapted to be reciprocated by means of a pitman-rod 9, connected to the link 7 and operated in any suitable manner. Beneath the screen 5 is a closed chamber 10, formed by a bottom piece 11, an end piece 12, and flexible webs 13 and 14, connected, respectively, to the frame of the screen 5 at opposite ends and to the end piece 12 and side wall of the casing 1. Into the chamber 10 leads an air-inlet pipe 15, through which a blast of air is adapted to be forced, and from the casing 1, above the screen 5, leads an exhaust-pipe 16. The screen 5 is slightly inclined, so that the crushed coffee when delivered thereon may be caused to pass from one end thereof, as clearly shown in the drawings. Beneath the screen 5 and the chamber 10 are disposed a second pair of crushing-rolls 17 and 18, the same being similar in construction to the rolls 3 and 4, heretofore referred to, but designed to crush the coffee passing between the same into a finer condition. These rolls are located between the parts 19 and 20 of a transverse diaphragm and have located above them a chute 21, having two inclined walls into which the coffee from the screen 5 is discharged. The purpose of said diaphragm is to prevent the passage of the air-current from the inlet-pipe 24 through the exhaust-pipe 16. Beneath the crushing-rolls 17 and 18 is located a shaking-screen 22, similar in all respects to the screen 5, heretofore referred to, and having beneath it a chamber 23, similar to the chamber 10, and connected with the screen 22 in a manner similar to that above described. Leading into the chamber 23 is an air-inlet pipe 24, and leading from the casing 1 above the screen 22 is an exhaust-pipe 25. The screen 22 is inclined and discharges the coffee therefrom into the chute or hopper 26, whence it may be delivered from the machine to any suitable point.

The outer portion of the silver skin is removed and the coffee roasted in the usual way. I have found that roasting renders the body proper of the coffee-bean exceedingly brittle, while the embedded silver skins remain relatively flexible. These conditions facilitate the subsequent purification of the granulated coffee. The roasted beans are then delivered into the machine through the chute or hopper 2 to the crushing-rolls 3 and 4. By the latter the coffee-beans are crushed or ground into a coarsely-granulated condition and dropped upon the screen 5, which is located directly beneath said crushing-rolls. On this screen, which is constantly being shaken or agitated by the means described, the crushed coffee is subjected to a blast of air entering the chamber 10 beneath the screen 5 through the pipe 15 and discharging through the exhaust-pipe 16. This current or blast of air carries off with it the light particles of matter contained in the crushed coffee, consisting of the dust and the chaff, which latter is produced by the silver skin from the inside of the coffee-bean. As the operation continues the crushed or granulated coffee is discharged from the delivery end of the screen 5 into the chute or hopper 21 and is then caused to pass between the second pair of crushing-rolls 17 and 18. By the latter rolls the coffee is reduced to a more finely divided granulated condition, and from the same it is delivered onto the shaking-screen 22. On the latter screen it is subjected to the action of a second blast of air, which enters the chamber 23 beneath the screen 22 through the pipe 24 and discharges from a point above the screen 22 through the exhaust-pipe 25. Any chaff, dust, or other light finely-divided impurities which escaped the action of the blast of air passing through the screen 5 are removed by the blast of air to which the coffee is subjected on the screen 22. As a result the final product, which is discharged from the machine through the chute or hopper 26, is superior in many respects to ordinary ground or granulated coffee—that is to say, it presents a much better appearance, in that the granules are of regular size and do not disclose the presence of dust or chaff therein. Furthermore, as the chaff produced by the silver skin from the interior of the bean contains a large percentage of tannic acid an important deleterious impurity has been removed and the flavor and aroma of the resulting product is radically improved.

Of course, if desired, the granulated product delivered from the machine through the discharge chute or hopper 26 may be further ground and pulverized.

I have shown and described two sets of crushing-rolls, shaking-screens, and means for subjecting the crushed coffee to the action of a blast of air; but it is obvious that I may increase or decrease the number of these sets of instrumentalities as may be found necessary or expedient.

Having now described my invention, what I claim as new, and desire to obtain by Letters Patent, is—

1. The process of preparing coffee for use, which consists in removing the outer skin; roasting the coffee, whereby the berry is rendered brittle while the embedded silver skins remain flexible; crushing the roasted berry and releasing the skins, and finally separating the skins from the granules by means of an air-current.

2. The process of treating coffee, which consists essentially in first roasting the coffee-bean, whereby the body of the bean is rendered brittle, while the embedded silver skin remains relatively flexible; then breaking the roasted bean and freeing the silver skin, and finally separating said skin from the broken body of the bean.

3. As a new article of manufacture, the roasted body of the coffee-bean, granulated and freed from the embedded silver skin.

In testimony whereof I have signed my name to this specification in the presence of two subscribing witnesses.

WILLIAM E. BAKER.

Witnesses:
  E. M. BOESEL,
  F. G. BRADBURY.